United States Patent
Hoerger et al.

(10) Patent No.: US 7,289,289 B2
(45) Date of Patent: Oct. 30, 2007

(54) RECORDING SERVO STRIPES ONTO A SERVO TRACK

(75) Inventors: Carl R. Hoerger, Boise, ID (US); Vernon L. Knowles, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/260,791

(22) Filed: Oct. 27, 2005

(65) Prior Publication Data

US 2007/0097537 A1      May 3, 2007

(51) Int. Cl.
*G11B 21/02* (2006.01)
(52) U.S. Cl. ....................................... 360/75
(58) Field of Classification Search ............... None
See application file for complete search history.

(56) References Cited

U.S. PATENT DOCUMENTS

| | | | |
|---|---|---|---|
| 6,542,325 B1 | 4/2003 | Molstad et al. | |
| 6,744,594 B2 * | 6/2004 | Denison et al. | 360/121 |
| 6,781,778 B1 * | 8/2004 | Molstad et al. | 360/48 |
| 6,873,487 B2 * | 3/2005 | Molstad | 360/75 |
| 6,879,457 B2 | 4/2005 | Eaton et al. | |
| 2005/0168869 A1 * | 8/2005 | Dugas et al. | 360/118 |

OTHER PUBLICATIONS

D.W. Johnson et al., "Frame Spacing Error in Time-Based Servo," ASME Information Storage and Processing Systems Conference 2005, pp. 1-3, Jun. 28-29, 2005.

\* cited by examiner

*Primary Examiner*—K. Wong

(57) ABSTRACT

To access data on a storage medium, at least three servo stripes simultaneously recorded in a servo track are read. The at least three servo stripes have different orientations on the servo track. An indication of a lateral position of a storage medium access head with respect to the servo track is generated based on reading the at least three servo stripes.

20 Claims, 5 Drawing Sheets

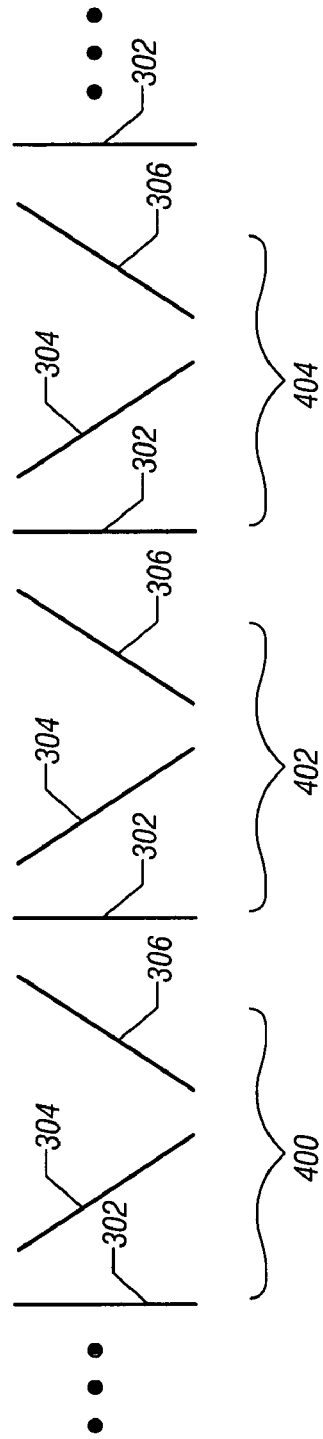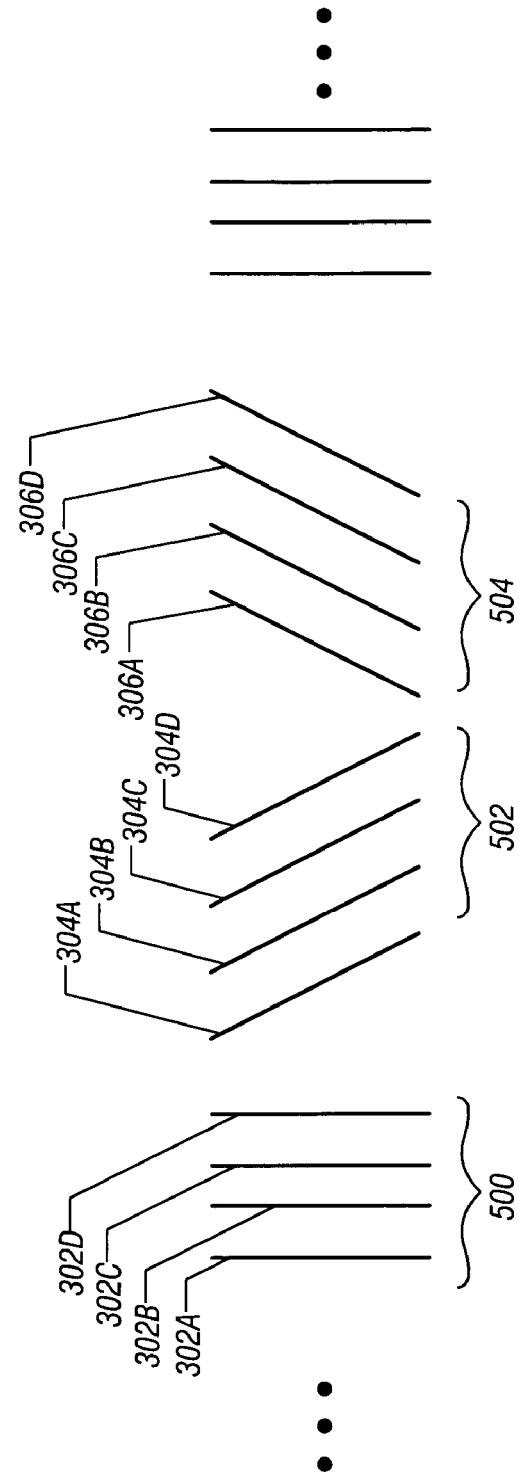

RECORDING SERVO STRIPES ONTO A SERVO TRACK

BACKGROUND

Various types of storage devices are available to store data for electronic devices. Examples of storage devices include tape-based storage devices, disk-based storage devices, integrated circuit (IC) storage devices, and others.

In a tape-based storage device, data is stored on plural data tracks of a storage tape, where the data tracks extend generally longitudinally along the storage tape. The reading and recording of data in the data tracks is accomplished by using tape heads, which typically include magnetic read/write heads for reading/recording data on magnetic storage tapes.

The storage tape is moved longitudinally with respect to the tape head as the recording operation or read operation proceeds. When reading from or writing to a storage tape, accurate lateral positioning of the tape head is desirable. To achieve accurate lateral positioning of the tape head, servo bands (or servo tracks) are recorded onto the storage tape. The servo bands contain servo patterns that are detectable by the tape head during read/write operations for determining the lateral position of the tape head with respect to the storage tape.

One approach of deriving lateral position information from a servo band is a timing-based servo approach. Typically, in this approach, the servo patterns recorded onto the servo band of the storage tape include servo "stripes" that are recorded with servo write elements on a tape head. In many conventional tape-based storage devices, a tape head includes two servo write elements that have different angular orientations with respect to the longitudinal axis of the linear tape to form a pair of servo stripes having different angular orientations (also referred to as azimuthal orientations). Repeating patterns of these servo stripes are recorded onto the storage tape. During a write or read operation, the tape head reads the servo stripes and derives various distance information (corresponding to distances between various pairs of servo stripes) to determine the lateral position of the tape head over the storage tape.

With a tape head that has just two servo write elements, the distances between successive pairs of servo stripes can vary if the tape speed varies during a servo write operation. Variations in tape speed would cause errors in the signals generated from reading the servo stripes for determining the lateral position of the tape head over the storage tape. Such errors would cause errors in the lateral position of read/write elements of the tape head with respect to the storage tape. Improper lateral positioning of read/write elements over a data track of the storage tape can cause errors to occur during data read or write operations. As track densities continue to increase on storage tapes, these errors induced by tape speed variations can cause increased likelihood of data errors occurring during data read or write operations.

BRIEF DESCRIPTION OF THE DRAWINGS

FIG. 4 shows successive groups of the servo pattern of FIG. 3, in accordance with an embodiment.

FIG. 5 shows a complex servo pattern formed from the servo pattern of FIG. 3, according to an alternative embodiment.

DETAILED DESCRIPTION

Figure 1:
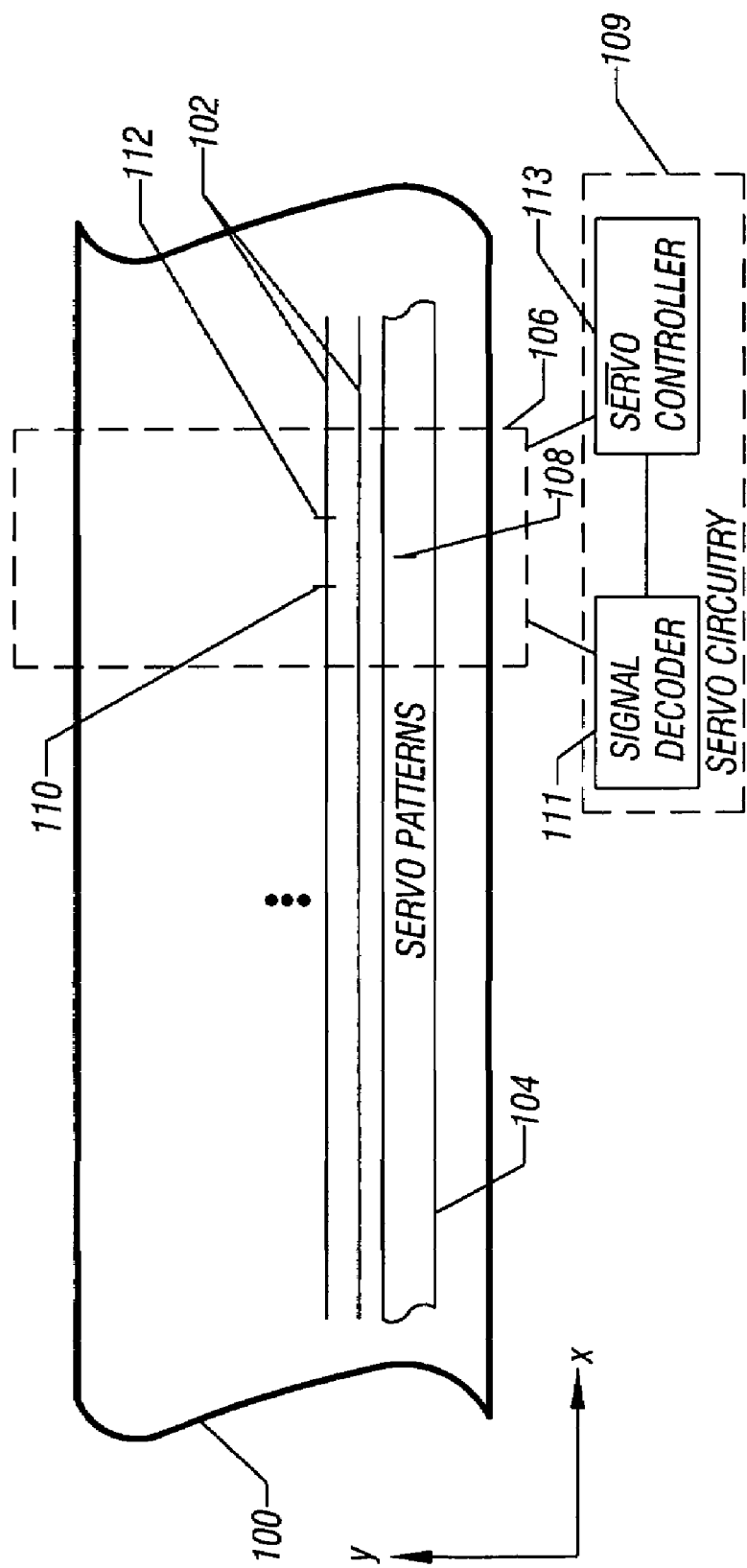
FIG. 1 shows a segment of a storage tape containing data tracks and a servo track having servo patterns according to some embodiments of the invention.

FIG. 1 shows an example arrangement of a linear storage tape 100, a tape head assembly 106, and associated servo circuitry 109 that includes a signal decoder 111 and a servo controller 113. The storage tape 100 (which in one embodiment is a magnetic storage tape) extends in a longitudinal direction x (along a length of the storage tape 100), and has a lateral dimension y (across a width of the storage tape 100).

Data tracks 102 for storing data are provided on the storage tape 100. The storage tape 100 also includes a servo track 104 (sometimes referred to as a servo band). Servo patterns are written onto the servo track during a preparatory formatting process known as "servo writing" prior to the actual use of the storage tape for data storage. Although one storage track 104 is depicted in FIG. 1, a storage tape 100 typically includes multiple servo tracks. In accordance with an embodiment, servo patterns written onto the servo track 104 include magnetic flux transitions (in the form of stripes) each extending across the width (in the lateral y direction) of the servo track 104.

In one example implementation, the storage tape 100 includes a storage tape according to the Linear Tape Open (LTO) format. In other implementations, other storage tape formats can be employed. Although discussed in the context of tape-based systems, it is noted that some embodiments of the invention are applicable to other types of storage systems, such as disk-based systems (e.g., disk drive systems). A disk drive system includes a disk (e.g., magnetic disk) on which servo tracks and data tracks are provided. The servo patterns that are used for the linear storage tape discussed in some embodiments herein are applicable for use in disk-based systems.

As used here, a "storage medium" refers generally to any of tape-based, disk-based, or other types of storage media. Also, a "servo track" refers to a servo track that can be recorded in any of these types of storage media. In the ensuing discussion, reference is made to storage tapes-however, note that the same or similar techniques described below are applicable to disks as well as other types of storage media.

The tape head assembly 106 is provided to read information (including data and servo information) from or write information to the storage tape 100. The tape head assembly 106 includes a servo read head 108 for reading the servo track 104 to provide servo information signals, which are representative of the lateral position (in the lateral y direction across the width of the storage tape 100) of the tape head assembly 106 relative to the storage tape 100. The tape head assembly 106 also includes a data read element 110 and a data write element 112 for reading and writing, respectively, data on the storage tape 100. The servo read head 108 has a width that is substantially less than the width of the servo track 104 to allow the determination of whether the read head 110 or write head 112 is properly positioned laterally (in the y direction) over a target data track 102.

The signal decoder 111 is coupled to the tape head assembly 106 to receive servo signals from the servo read head 108 (based on reading servo patterns). Note that the circuitry associated with data read and data write operations are not depicted in FIG. 1. The signal decoder 111 decodes servo signals received from the servo read head 108 and derives a position error signal (PES), which is provided to the servo controller 113. The servo controller 113, in response to the PES, provides signals to the tape head assembly 106 to adjust the lateral position of the tape head assembly 106 with respect to the servo track 104 such that the data read head 110 or data write head 112 is properly centered with respect to a target data track 102. The PES is one form of indication regarding the lateral position of a tape head assembly that can be used to adjust the lateral position of the tape head assembly. In other embodiments, other forms of indications of lateral positioning of a tape head assembly with respect to a storage medium can be used.

More generally, indications of lateral positioning of a storage medium access head can be generated based on reading servo patterns on the storage medium. A "storage medium access head" includes any component (or assembly of components) for reading or writing information on a storage medium. In a tape-based storage system, the storage medium access head comprises a tape head to read from or write to storage tape. In a disk-based storage system, the storage medium access head comprises a disk head to read from or write to a storage disk.

Figure 2:
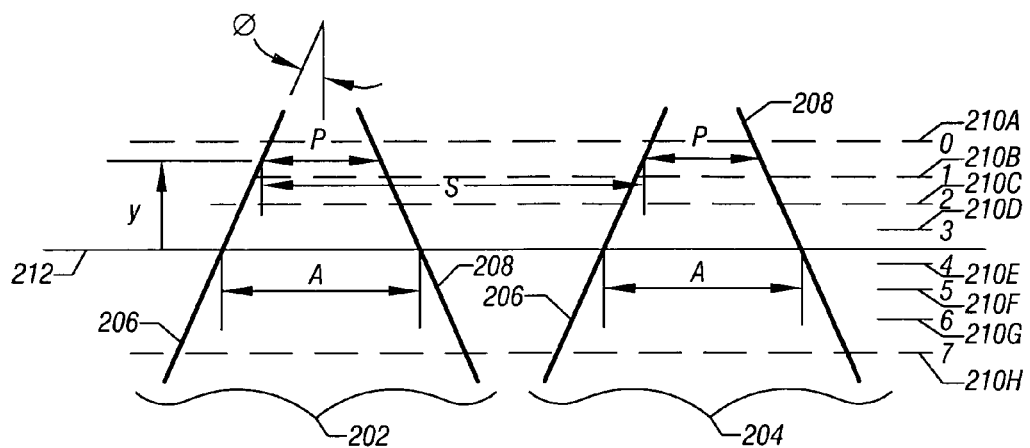
FIG. 2 shows a conventional servo pattern.

FIG. 2 shows one conventional arrangement of servo stripes that can be formed on a servo track. Two pairs 202 and 204 of servo stripes are depicted in FIG. 2. Each pair 202, 204 of servo stripes is recorded by two servo write elements (having a spaced apart arrangement) of a servo write head. Each pair 202, 204 includes a first servo stripe 206 slanted in a first direction, and a second servo stripe 208 slanted in a second direction. The two servo stripes 206 and 208 are considered to have different angular orientations (or azimuthal orientations) across the width of a servo track. Due to the different slanted orientations of the servo stripes 206 and 208, the servo stripes are not parallel to each other.

With many conventional servo mechanisms, the first pair of servo stripes 202 is recorded simultaneously onto the servo track, and the subsequent pair 204 of servo stripes is recorded at a later time. The pairs of servo stripes are repeated along the length of the servo track.

A PES is generated by measuring two intervals: a P interval (between servo stripes 206 and 208 of different orientations), and an S interval (between servo stripes 206 of the same orientation). In FIG. 2, the S interval is defined between the servo stripe 206 in first pair 202 and the servo stripe 206 in second pair 204. In the conventional arrangement of FIG. 2, the S interval is considered to be a reference interval that is dependent upon the speed of the storage tape with respect to the tape head assembly. Variations in tape speed will cause the spacing between adjacent pairs of stripes to change, thereby changing the S interval. The P interval (because it is measured between two servo stripes of different orientations) provides an indication of the lateral position across the servo track. The P and S intervals can represent either a time interval or distance interval.

Dashed lines 210A-210H are shown in FIG. 2 to correspond to center positions with respect to respective data tracks 0-7. In other words, if the servo head is centered on dashed line 210A, then the read or write head of the tape head assembly would be accurately centered with respect to data track 0. Similarly, if the servo read head is centered on dashed line 210B, then the read or write head would be positioned accurately with respect to data track 1. However, as is typical during a read or write operation, the tape head assembly 106 may not be accurately positioned with respect to a particular data track, which would result in the servo read head not being centered on a particular one of the track centers 210A-210H. The mis-alignment of a servo read head with respect to the desired track center is detected by the servo circuitry for the purpose of adjusting the lateral position of the tape head assembly.

As further shown in FIG. 2, a center line 212 represents the center line of the servo track. The distance between the servo stripes 206 and 208 at the center line 212 is A. The distance from the center line 212 in the lateral direction is represented by y. The angle of the servo stripe 206 with respect to an axis that is parallel to the lateral direction (or y direction) of the servo track is represented as Ø. The PES for the FIG. 2 arrangement is calculated as follows:

$$PES = y - y_D, \quad (\text{Eq. 1})$$

where y represents the actual location of the servo read head as measured from the center line 212, and $y_D$ is the desired location (the location at which the servo read head would be centered at one of the target track centers 210A-210H) with respect to the center line 212. The value of y is calculated as follows:

$$y = \frac{A - (P/S)S_{nom}}{2 \cdot \tan\emptyset}, \quad (\text{Eq. 2})$$

where $S_{nom}$ is a nominal fixed value intended to represent an interval between servo stripes, assuming the tape speed during a servo writing operation is accurate. However, due to various reasons, tape speed fluctuations usually occur during servo writing. As a result, the actual value of $S_{nom}$ will be different if tape speed fluctuation is experienced during the servo writing operation. Based on the above equations, the PES is then calculated as follows:

$$PES = \frac{P - (P/S)S_{nom}}{2 \cdot \tan\emptyset}. \quad (\text{Eq. 3})$$

If the error for the tape speed is represented by a number Δ such that Δ represents a percentage of error for the tape speed, then the error in the PES due to tape speed fluctuation is as follows:

$$PES_{SWS} = \frac{P \cdot \Delta}{200 \cdot \tan\emptyset}. \quad (\text{Eq. 4})$$

The value of $PES_{sws}$ represents the amount of error in the PES due to tape speed fluctuation represented by Δ during a servo writing operation. In other words, $PES_{sws}$ is the contribution to PES due to servo write speed (SWS) variation. Based on the above equation, it is noted that the error in PES ($PES_{sws}$) is directly proportional to the P value and therefore increases linearly as the P value increases. In other words, the error is greater in regions of the servo track where P has a larger value (such as in regions corresponding to track center 7. Thus, any fluctuation in tape speed will be magnified for lateral alignment positioning with respect to data track 7 in FIG. 2.

To enhance accuracy of lateral alignment of the tape head assembly 106 (FIG. 1) with respect to the storage tape 100 in accordance with some embodiments, at least three servo stripes of a servo pattern are recorded simultaneously onto a servo track, such as servo track 104 (FIG. 1). The three simultaneously recorded servo stripes are then used to derive the P and S values used for calculating PES (or some other form of indication that represents a lateral position of a tape head). Since the three stripes are recorded simultaneously, any fluctuations in tape speed will not be reflected in the S value (or in the P value) used for calculating the PES. Therefore, since P and S remain constant even if tape speed variation is present, the derived PES will be accurate.

As noted above, conventional servo techniques typically define the reference interval (e.g., the S interval) as being between two identical stripes (such as stripes 206 in FIG. 2). Having to define the reference interval as being between two identically oriented servo stripes reduces flexibility in how servo patterns can be defined. According to some embodiments, the S interval (or other form of reference interval) can be defined between servo stripes of different orientations.

Although reference is made to the P and S intervals in this discussion, it is noted that other forms of intervals can be defined for developing indications of lateral positioning of a tape head with respect to a storage medium. More generally, the servo stripes according to some embodiments are detectable to define a first interval that is based on at least two servo stripes of different orientations such that the first interval varies along the width (or lateral direction y) of the servo track 106; and a reference interval that is based on at least three servo stripes such that the reference interval does not change value across the width of the servo track 106. The first interval and reference interval are used to determine the lateral position of a tape head with respect to the servo track. The term "interval" refers to either a time interval or a distance interval.

Figure 3:
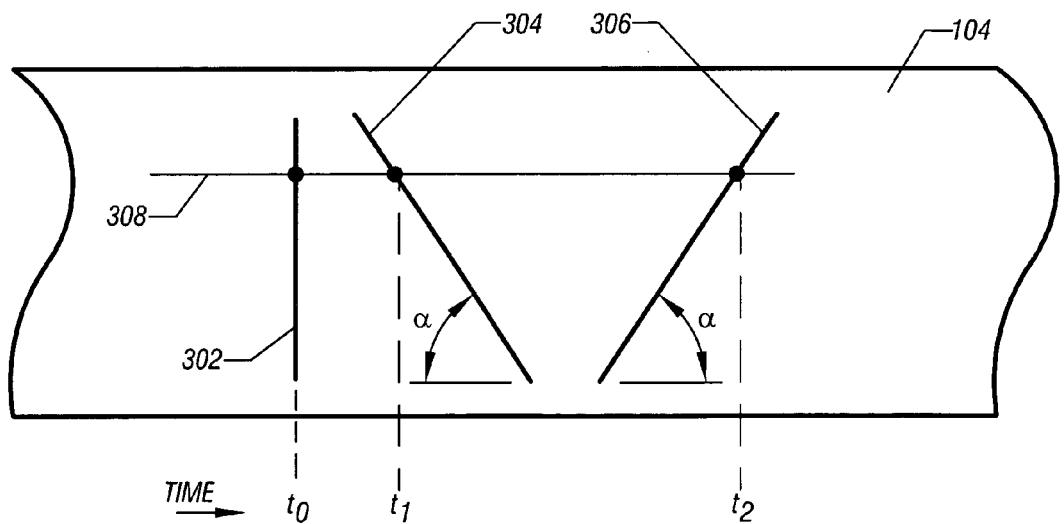
FIG. 3 shows three servo stripes of a servo pattern, where the three servo stripes are recorded simultaneously, in accordance with an embodiment.

FIG. 3 illustrates an example combination of three servo stripes that are recorded simultaneously by a servo write head. The servo stripes include a first vertical servo stripe 302 (which extends along the direction that is generally parallel to the lateral direction y of the servo track), a second servo stripe 304 having a first slanted orientation (with angle $-\alpha$ between the stripe 304 and the longitudinal axis of the servo track), and a third servo stripe 306 having a second slanted orientation (with angle $+\alpha$ between the stripe 306 and the longitudinal axis of the servo track). An example value of $\alpha$ can be about 6°, although other values can also be used. The three servo stripes have three different orientations on the servo track. In other embodiments, other combinations of stripes with different combinations of orientations can be employed (e.g., the vertical stripe 302 can be positioned between two slanted stripes, and so forth). Moreover, in other embodiments, more than three servo stripes can be recorded simultaneously (e.g., four servo stripes, five servo stripes, and so forth) by a respective number of servo write elements (e.g., four servo write elements, five servo write elements, and so forth).

With the combination of servo stripes in FIG. 3, the P value can be defined as the interval between the vertical stripe 302 and the first slanted stripe 304 along a particular line 308 (that represents the current lateral position of the servo read head 108). Thus, P is defined as follows:

$$P = t_1, \quad \text{(Eq. 5)}$$

where $t_1$ represents a time interval between the vertical stripe 302 and the first slanted stripe 304 along line 308. Although the interval for defining P is expressed as a time interval, note that the interval can also be just as easily expressed as a distance interval (which can be calculated by the servo circuitry 109 based on measurements by the servo read head 108 and signal decoder 111). The S interval is defined as follows:

$$S = t_1 + t_2, \quad \text{(Eq. 6)}$$

where $t_2$ represents the time interval between the vertical stripe 302 and the second slanted stripe 306 along line 308. The S interval is thus equal to the sum of (a) the interval ($t_1$) between the vertical stripe 302 and the first slanted stripe 304, and (b) the interval ($t_2$) between the vertical stripe 302 and the second slanted stripe 306. Again, the S interval can just as easily be represented as a distance interval (rather than the timing interval indicated in the equation above). According to some embodiments, the three servo stripes together define the S interval (sum of $t_1$ and $t_2$ in one example embodiment).

In one implementation, PES is calculated as follows:

$$PES \equiv \frac{P}{S} = \frac{t_1}{t_1 + t_2} \quad \text{(Eq. 7)}$$

As $t_1$ increases (going from the top of the servo track 104 in the FIG. 3 orientation to the bottom of the servo track along the lateral direction y), $t_2$ decreases by an equal amount. Therefore, the sum $t_1 + t_2$, which defines the reference interval S, remains constant and does not vary with varying lateral positions of the servo read head 108 over the width of the servo track. However, the value $t_1$ (which is equal to P) does vary with varying lateral positions the servo read head 108.

In an alternative embodiment, PES can be defined as follows:

$$PES \equiv \frac{t_2 - t_1}{t_1 + t_2}. \quad \text{(Eq. 8)}$$

In the above equation, P is equal to the difference between $t_2$ and $t_1$ (rather than just equal to $t_1$ in the implementation discussed further above). The benefit of using the latter equation (Eq. 8) is that larger amplitudes of PES can be obtained for better signal-to-noise performance.

Repeating patterns of the three-stripe combination of FIG. 3 is depicted in FIG. 4. The repeating patterns depicted in FIG. 4 includes a first group 400 (of three simultaneously recorded stripes 302, 304, 306), a second group 402 (of three simultaneously recorded stripes), and a third group 404 (of three simultaneously recorded stripes). Note that in other embodiments, each group 400, 402, and 404 can include four or more stripes.

FIG. 5 illustrates a more complex pattern derived from the three-stripe combination of FIG. 3. In this complex pattern, the vertical stripe 302 is repeated to form multiple vertical stripes 302A-302D in a first region 500, the first slanted stripe 304 is repeated in a second region 502 to form multiple first slanted stripes 304A-304D, and the second slanted stripe 306 is repeated in a third region 504 to form multiple second slanted stripes 306A-306D. In each of the regions 500, 502, and 504, the corresponding stripe is repeated four times (note that in other implementations a stripe can be repeated a different number of times, such as 2, 3, 5, etc., in each region,).

A combination of three stripes 302, 304, and 306 from respective regions 500, 502, and 504 are recorded simultaneously. Thus, the three stripes 302A, 304A, and 306A are recorded simultaneously (these stripes can be considered to be part of a first group); the three stripes 302B, 304B, and 306B (second group) are recorded simultaneously; the three stripes 302C, 304C, and 306C (third group) are recorded simultaneously; and the three stripes 302D, 304D, and 306D (fourth group) are recorded simultaneously. To form the three regions 500, 502, and 504 of repeated stripes, four recordings are performed (where each recording records simultaneously a vertical stripe 302, a first slanted stripe 304, and a second slanted stripe 306).

For the embodiment depicted in FIG. 5, during the servo read process, the P and S intervals are measured multiple times (four times in the example of FIG. 5). The P and S intervals calculated for the four groups of stripes 302A-D, 304A-D, and 306A-D are averaged to provide better signal-to-noise performance.

Figure 6:
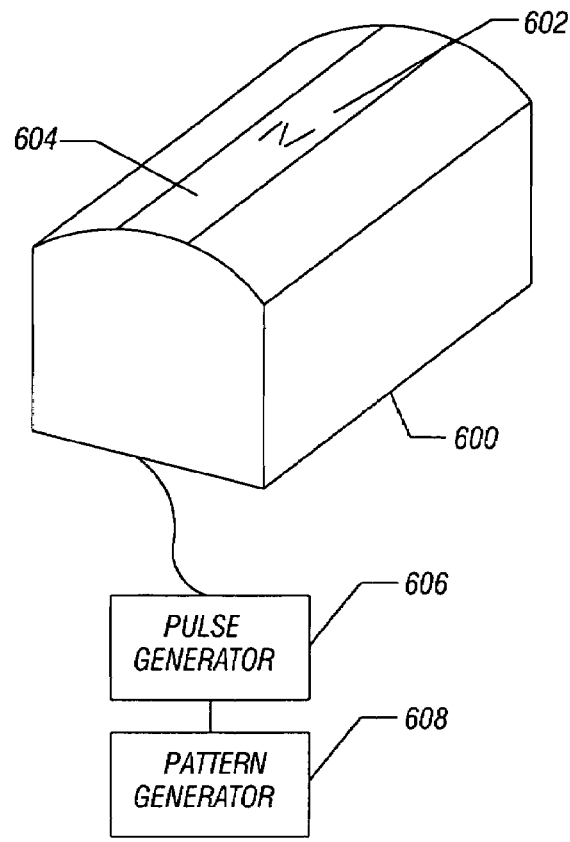
FIG. 6 shows servo write circuitry according to an embodiment.

As noted above, a servo write head is used for recording servo patterns onto servo tracks. One example of such a servo write head 600 is depicted in FIG. 6. Note that the servo write head 600 is part of a servo pattern recording system for performing prepatory formatting with respect to the storage tape. Such a servo pattern recording system is usually different from the storage system that includes the tape head assembly 106 of FIG. 1 for reading the servo pattern and to read or write data onto the storage tape.

The servo write head 600 includes a surface 604 on which are formed servo write elements 602. In the embodiment depicted in FIG. 6, three servo write elements 602 are depicted to allow the simultaneous recording of three servo stripes (such as the servo stripes of FIG. 3). Storage tape is passed across the region 604 to allow the recording of the servo stripes onto the storage tape.

To produce the desired servo pattern on the storage tape, the tape is moved at a velocity while the servo write head 600 is intermittently pulsed with current produced by a pulse generator 606. The current pulses generated by the servo write head 600 enable the servo write elements 602 to produce flux patterns on the storage tape that correspond to the servo stripes. The pulse generator 606 is controlled by a pattern generator 608 to determine when the current pulses are provided by the servo write head 600. More generally, a control mechanism (the pulse generator 606 and pattern generator 608 are considered on example type of the control mechanism) is used to control the servo write head 600 to write a desired servo pattern (such as the servo pattern of FIG. 4 or 5).

Figure 7:
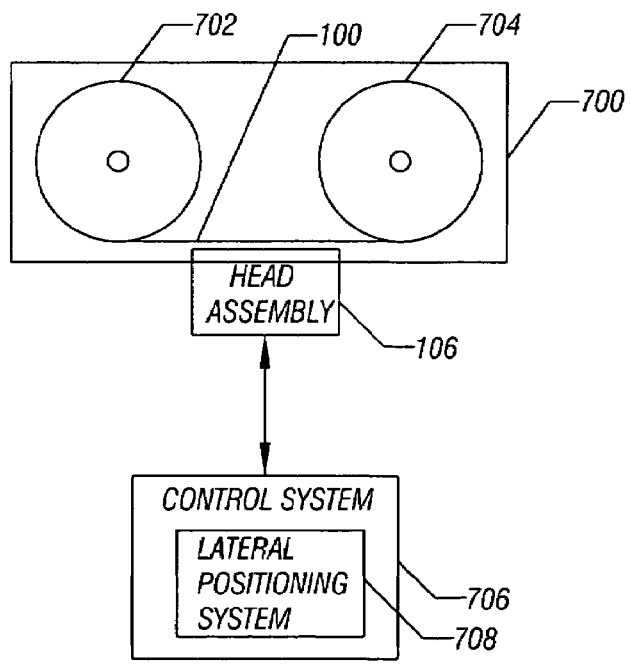
FIG. 7 is a block diagram of a tape storage device, according to an embodiment.

FIG. 7 shows portions of a tape-based storage system that includes a tape cartridge 700 that has two rotatable reels 702 and 704 on which storage tape 100 is mounted. The reels 702 and 704 are rotatable to allow the storage tapes 100 to move across the tape head assembly 106. The tape head assembly 106 is controlled by a control system 706 that includes a lateral positioning system 708 for controlling the lateral position of the tape head assembly 106 with respect to the storage tape 100. The lateral positioning system 708 includes the servo circuitry 109 of FIG. 1.

Figure 8:
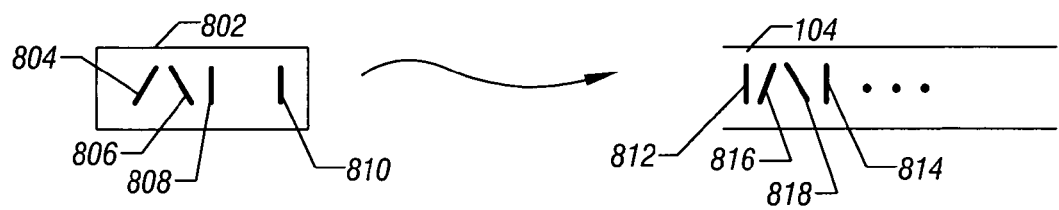
FIGS. 8-11 show alternative arrangements of servo write heads and servo stripes, in accordance with alternative embodiments.

Alternative arrangements of servo stripes are depicted in FIGS. 8-11. In FIG. 8, a servo write head 802 includes two vertical servo write elements 808 and 810, a first slanted servo write element 804 slanted in a first orientation, and a second slanted servo write element 806 slanted in a second, different orientation than the first orientation. The servo write elements 804, 806 are able to simultaneously record corresponding slanted servo stripes 816, 818 on servo track 104 (at a first time instance), while subsequently at a second time instance, the servo write elements 808, 810 are able to simultaneously record corresponding vertical stripes 812, 814 on servo track 104. The P interval is defined between the two slanted stripes 816, 818, while the S interval is defined between the two vertical stripes 812, 814. PES can be calculated based on the P and S intervals. Note that since the two S servo stripes 812, 814 are recorded simultaneously in servo track 104, the S interval for this arrangement does not vary with tape speed during a servo writing operation.

Figure 9:
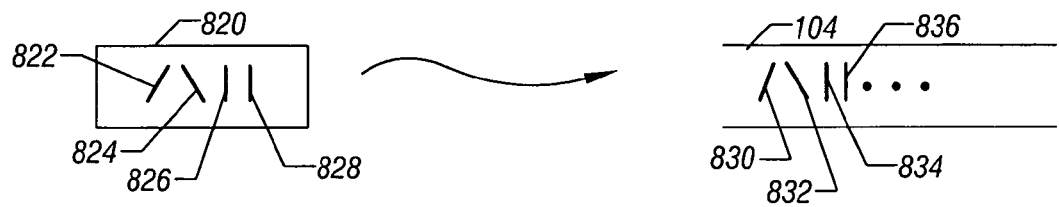

In a variation of the FIG. 8 embodiment, FIG. 9 depicts a servo write head 820 that includes two vertical servo write elements 826, 828, a first slanted servo write element 822, and a second slanted servo write element 824. Although the general azimuthal orientations of servo write elements 822, 824, 826, and 828 are similar to the azimuthal orientations of corresponding servo write elements 804, 806, 808, and 810 of FIG. 8, the spacings among the servo write elements 822, 824, 826, 828 differ from the spacings among servo write elements 804, 806, 808, 810.

The servo write elements 822, 824 are able to simultaneously record corresponding slanted servo stripes 830, 832 in servo track 104, while the servo write elements 826, 828 are able to simultaneously record (at a later time instance) servo stripes 834, 836 in servo track 104. Note that in servo track 104 depicted in FIG. 9, the two vertical servo stripes 834, 836 are positioned longitudinally after the two slanted servo stripes 830, 832. This arrangement is contrasted to the arrangement of FIG. 8, where the slanted servo stripes 816, 818 are positioned between the two vertical servo stripes 812, 814. The P interval is defined between slanted servo stripes 830, 832, and the S interval is defined between vertical servo stripes 834, 836.

Figure 10:
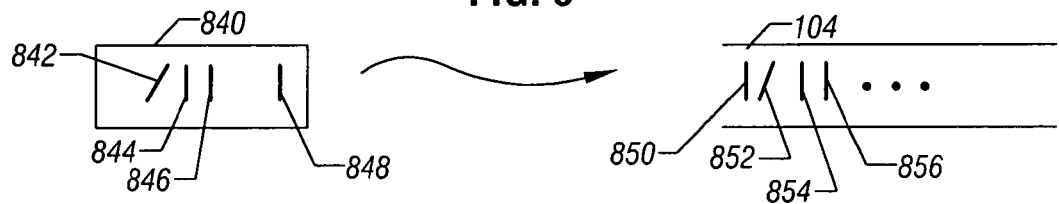

Another variation is depicted in FIG. 10, in which a servo write head 840 includes a slanted servo write element 842 and three vertical servo write elements 844, 846, and 848. The servo write elements 842, 844 are able to simultaneously record servo stripes 852, 854 in servo track 104, and the servo write elements 846, 848 are able to simultaneously record (at a later time instance) servo stripes 850, 856. The P interval is defined between servo stripes 852 and 854, and the S interval is defined between servo stripes 850 and 856.

Many other variations are also possible. Generally, the servo write heads depicted in FIGS. 8-10 include two sets of servo write elements, with a first set to simultaneously record servo stripes for defining the P interval, and a second set to simultaneously record (at a later time instance) servo stripes for defining the S interval; or vice versa. Note that each of the first and second sets can include more than two (e.g. three or more) servo write elements to simultaneously record corresponding groups of three or more servo stripes.

Figure 11:
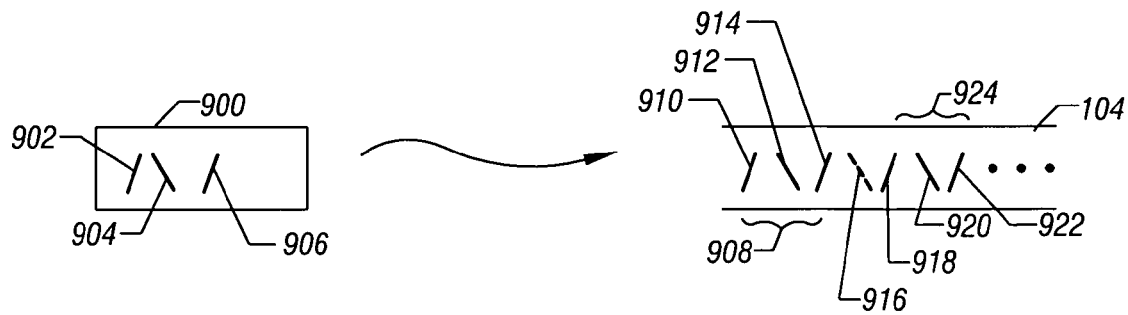

In another embodiment, as depicted in FIG. 11, a servo write head 900 includes at least three servo write elements 902, 904, 906, in which servo write elements 902, 906 have the same azimuthal orientation, while servo write element 904 has a different azimuthal orientation. During a servo write operation, a first group 908 of servo stripes are recorded simultaneously by the servo write elements 902, 904, 906 in servo track 104. Next, the center servo write element 904 is used to form a single servo stripe 916. The single servo stripe 916 can be considered to be part of a second group of one or more servo stripes, where the second group has less servo stripes than the first group. The three servo write elements 902, 904, 906 are then used to record simultaneously the next group 924 of servo stripes 918, 920, 922.

In this arrangement, a P interval can be measured between servo stripes 910, 912; between servo stripes 914, 916; and between servo stripes 918, 920. The S interval can be measured between servo stripes 910, 914; between servo stripes 914, 918; and between servo stripes 918, 922. In this arrangement, every other measurement of P and S has the tape speed variation eliminated (P measured between 910, 912 and P measured between 918, 922; and S measured between 910, 914 and S measured between 918, 922). During servo read, the servo read head measures P and S intervals between repeating patterns of servo stripes. Every other measurement of P and S is skipped such that only servo write tape speed invariant P and S measurements are used. A benefit of this approach is that a speed-invariant servo pattern can be formed that has the identical pattern as some conventional servo patterns (such as that depicted in FIG. 2). This approach provides for backwards compatibility with conventional logic for deriving PES from P and S intervals.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of accessing data on a storage medium, comprising:
    reading at least three servo stripes simultaneously recorded in a servo track on the storage medium, wherein the at least three servo stripes have at least three different orientations with respect to each other on the servo track;
    measuring a first interval that is based on at least two of the servo stripes of different orientations;
    measuring a reference interval that is based on each of the at least three servo stripes such that the reference interval does not change value across the width of the servo track; and
    generating an indication of a lateral position of a storage medium access head with respect to the servo track based on measurements of the first and reference intervals.

2. The method of claim 1, wherein
    the first interval varies along a width of the servo track.

3. The method of claim 2, wherein the at least three servo stripes include a first servo stripe, a second servo stripe, and a third servo stripe, wherein measuring the first interval is based on an interval between the first stripe and the second stripe, and wherein measuring the reference interval is based on a sum of an interval between the first and second servo stripes, and an interval between the first and third servo stripes.

4. The method of claim 3, wherein generating the indication is based on dividing the first interval by the reference interval.

5. The method of claim 2, wherein the at least three servo stripes include a first servo stripe, a second servo stripe, and a third servo stripe,
    wherein measuring the first interval is based on a difference between a second interval and a third interval, the second interval being between the first stripe and the second stripe, and the third interval being between the first stripe and the third stripe, and
    wherein measuring the reference interval is based on a sum of the second and third intervals.

6. The method of claim 5, wherein generating the indication comprises generating a position error signal, the position error signal being equal to the first interval divided by the reference interval.

7. The method of claim 1, further comprising adjusting the lateral position of the storage medium access head based on the indication.

8. The method of claim 7, wherein adjusting the lateral position of the storage medium access head comprises adjusting the lateral position of one of a tape head and disk head, wherein the storage medium comprises one of a storage tape and storage disk.

9. The method of claim 1, wherein reading the at least three servo stripes comprises reading a first group of at least three servo stripes, the method further comprising reading additional groups of at least three servo stripes,
    wherein generating the indication is based on reading the groups of at least three servo stripes.

10. The method of claim 9, further comprising measuring intervals associated with the groups of at least three servo stripes, wherein generating the indication is based on averaging the measured intervals associated with the groups.

11. A storage system comprising:
    a storage medium access head comprising at least one servo read head to read at least three servo stripes simultaneously recorded in a servo track of a storage medium, the at least three servo stripes having non-identical orientations corresponding to at least three different orientations on the servo track; and
    a decoder to determine a reference interval and generate an indication of a lateral position of the at least one servo read head with respect to the storage medium based on the reference interval that is a sum of (1) a first interval between a first stripe and a second stripe and (2) a second interval between the first stripe and a third stripe.

12. The storage system of claim 11, wherein the first interval varies along a width of the servo track and the reference interval does not change value across the width of the servo track.

13. The storage system of claim 12, wherein the first interval is defined as an interval between a vertical stripe and a slanted stripe of the servo track.

14. The storage system of claim 13, wherein the indication is based on division of the first interval by the reference interval.

15. The storage system of claim 13, wherein the decoder is adapted to determine a difference value that is a difference between the first interval and the second interval, the indication based on division of the difference value by the reference interval.

16. A storage medium comprising:
    a servo track having at least three servo stripes having at least three different orientations with respect to each other and recorded simultaneous on the storage medium, the at least three servo stripes defining a first interval that varies along a width of the servo track and a reference interval based on each of the at least three servo stripes such that the reference interval does not change value across the width of the servo track, wherein the first and reference intervals generate an indication of a lateral position of a storage medium access head with respect to the storage medium.

17. The storage medium of claim 16, wherein the servo track comprises plural groups of the at least three servo stripes.

18. The storage medium of claim 16, wherein one of the at least three servo stripes has a vertical orientation, and another two of the at least three servo stripes have corresponding different slanted orientations.

19. The storage medium of claim 16, wherein the first interval has a first time equal time (t1), and the reference interval has a second time equal to the time (t1) plus a time (t2), where the time (t2) represents a time interval between a vertical stripe and a slanted stripe of the servo track.

20. A tape cartridge comprising:
at least one reel; and
a storage tape mounted on the reel, the storage tape comprising a servo track having at least three servo stripes having at least three different orientations with respect to each other and recorded simultaneously on the storage tape, the servo track providing a first interval that is based on at least two of the servo stripes of different orientations and providing a reference interval that is based on all of the at least three servo stripes such that the reference interval does not change value across the width of the servo track, wherein the first and reference intervals indicate a lateral position of a tape head with respect to the servo track.

* * * * *

UNITED STATES PATENT AND TRADEMARK OFFICE
CERTIFICATE OF CORRECTION

PATENT NO. : 7,289,289 B2
APPLICATION NO. : 11/260791
DATED : October 30, 2007
INVENTOR(S) : Carl R. Hoerger et al.

It is certified that error appears in the above-identified patent and that said Letters Patent is hereby corrected as shown below:

In column 10, line 63, in Claim 16, delete "simultaneous" and insert -- simultaneously --, therefor.

In column 11, line 13, in Claim 19, after "equal" insert -- to --.

Signed and Sealed this

Fifth Day of August, 2008

JON W. DUDAS
*Director of the United States Patent and Trademark Office*